US008925242B1

(12) United States Patent
Thomson

(10) Patent No.: US 8,925,242 B1
(45) Date of Patent: Jan. 6, 2015

(54) MEANS OF CONVERTING A TROLLING DIVER TO ENABLE THE DISTRIBUTION OF FISH ATTRACTING SCENT IN WATERSURROUNDING A LURE

(76) Inventor: James D. Thomson, Bellevue, OH (US)

( * ) Notice: Subject to any disclaimer, the term of this patent is extended or adjusted under 35 U.S.C. 154(b) by 533 days.

(21) Appl. No.: 13/183,392

(22) Filed: Jul. 14, 2011

(51) Int. Cl.
*A01K 85/01* (2006.01)
*A01K 97/02* (2006.01)

(52) U.S. Cl.
USPC ........................................ 43/43.13; 43/42.06

(58) Field of Classification Search
USPC ............ 43/43.13, 42.06, 44.99, 43.14, 42.22, 43/17.2, 42
See application file for complete search history.

(56) References Cited

U.S. PATENT DOCUMENTS

| | | | | |
|---|---|---|---|---|
| 2,481,975 A * | 9/1949 | Brooks | | 43/17.2 |
| 2,557,776 A * | 6/1951 | Anderson | | 43/43.14 |
| 2,709,317 A * | 5/1955 | Pease, Sr. | | 43/44.99 |
| 2,713,744 A * | 7/1955 | Strausser, Sr. | | 43/44.99 |
| 2,729,014 A * | 1/1956 | Johnson | | 43/43.14 |
| 2,771,704 A * | 11/1956 | Biggs | | 43/57.1 |
| 2,926,449 A * | 3/1960 | Rupert | | 43/17.2 |
| 2,983,065 A * | 5/1961 | Ferguson et al. | | 43/42.06 |
| 3,083,492 A * | 4/1963 | Kling | | 43/43.13 |
| 3,163,958 A * | 1/1965 | Quinn | | 43/42.06 |
| 3,364,611 A * | 1/1968 | Downing | | 43/17.2 |
| 3,453,768 A * | 7/1969 | Feaster et al. | | 43/42.06 |
| 3,505,754 A * | 4/1970 | Lawlor | | 43/42.22 |
| 3,570,167 A * | 3/1971 | Smith | | 43/42.06 |
| 3,605,316 A * | 9/1971 | Rogers | | 43/42.06 |
| 3,688,429 A * | 9/1972 | Mauck | | 43/17.2 |
| 3,708,903 A * | 1/1973 | Bercz et al. | | 43/42.06 |
| 3,722,128 A * | 3/1973 | Tremblay | | 43/42.06 |
| 3,736,690 A * | 6/1973 | Witkowski | | 43/43.14 |
| 3,772,815 A * | 11/1973 | Burgess | | 43/17.2 |
| 3,844,059 A * | 10/1974 | Weber | | 43/43.13 |
| 3,916,556 A * | 11/1975 | Armanno | | 43/42.06 |
| 3,940,872 A * | 3/1976 | Weber | | 43/43.13 |
| 3,953,934 A * | 5/1976 | Visser | | 43/42.06 |
| 4,044,490 A * | 8/1977 | Young et al. | | 43/42.06 |
| 4,121,368 A * | 10/1978 | Norwood | | 43/43.2 |
| 4,567,687 A * | 2/1986 | Even et al. | | 43/43.13 |
| 5,157,856 A * | 10/1992 | Packer | | 43/17.2 |
| 5,339,561 A * | 8/1994 | Weber | | 43/43.13 |
| 6,016,622 A * | 1/2000 | Even | | 43/43.13 |
| D421,088 S * | 2/2000 | Douglas | | D22/144 |
| 6,061,947 A * | 5/2000 | Mooers | | 43/42.06 |
| 6,161,324 A * | 12/2000 | Hugunin | | 43/42.06 |
| 6,298,595 B1 * | 10/2001 | Friedlob | | 43/42.06 |
| 7,225,583 B1 * | 6/2007 | Stacy et al. | | 43/44.99 |
| 7,380,365 B2 * | 6/2008 | Noraker | | 43/42.06 |
| 7,451,567 B2 * | 11/2008 | Irvine | | 43/17.2 |
| 7,520,086 B2 * | 4/2009 | Melhorn et al. | | 43/42.06 |
| 7,520,087 B1 * | 4/2009 | Even | | 43/43.13 |
| 7,520,088 B2 * | 4/2009 | Even | | 43/43.13 |

(Continued)

FOREIGN PATENT DOCUMENTS

| | | | | | |
|---|---|---|---|---|---|
| JP | 01080240 A | * | 3/1989 | | A01K 97/02 |
| JP | 07289129 A | * | 11/1995 | | A01K 97/02 |

(Continued)

*Primary Examiner* — Darren W Ark
(74) *Attorney, Agent, or Firm* — Jerry Semer

(57) ABSTRACT

A means and apparatus that provide a trail of at least one of a type of fish attracting Scent to be disbursed into the water surrounding a fishing Diver ahead of a Lure that is being trolled behind it.

8 Claims, 5 Drawing Sheets

(56) References Cited

U.S. PATENT DOCUMENTS

| | | | |
|---|---|---|---|
| 7,637,051 B2 * | 12/2009 | Emory | 43/43.13 |
| 7,703,235 B2 * | 4/2010 | Ford | 43/43.13 |
| 2004/0244270 A1 * | 12/2004 | Brinker et al. | 43/43.13 |
| 2006/0005456 A1 * | 1/2006 | Harris et al. | 43/42.06 |
| 2006/0005457 A1 * | 1/2006 | Harris et al. | 43/42.06 |
| 2006/0213113 A1 * | 9/2006 | Emory | 43/43.13 |
| 2006/0218848 A1 * | 10/2006 | Melhorn et al. | 43/44.99 |
| 2006/0260181 A1 * | 11/2006 | Enos et al. | 43/43.13 |
| 2007/0199235 A1 * | 8/2007 | Yu | 43/44.99 |
| 2009/0113784 A1 * | 5/2009 | Brinker et al. | 43/43.14 |
| 2009/0133315 A1 * | 5/2009 | Bono | 43/43.12 |

FOREIGN PATENT DOCUMENTS

| | | | | |
|---|---|---|---|---|
| JP | 08149939 A | * | 6/1996 | A01K 97/02 |
| JP | 10084826 A | * | 4/1998 | A01K 97/02 |
| JP | 11032640 A | * | 2/1999 | A01K 97/02 |
| JP | 11243827 A | * | 9/1999 | A01K 97/02 |
| JP | 2000083544 A | * | 3/2000 | A01K 97/02 |
| JP | 2003235421 A | * | 8/2003 | A01K 97/02 |
| JP | 2004208629 A | * | 7/2004 | A01K 97/02 |

* cited by examiner

MEANS OF CONVERTING A TROLLING DIVER TO ENABLE THE DISTRIBUTION OF FISH ATTRACTING SCENT IN WATER SURROUNDING A LURE

FIELD OF THE INVENTION

This invention relates to a means and apparatus for dispensing fish attracting scent (hereinafter "Scent") into the water surrounding a fishing lure or bait (hereinafter "Lure") as it is trolled through the water to attract the at least one of a species of fish to the Lure.

In its preferred embodiment, this invention is a conversion kit for use with a trolling diver (hereinafter "Diver") that is used to take a Lure to a predetermined depth and position when trolling. This invention modifies the Diver to accommodate the insertion of a Scent, which when trolled through the water will not only surround the Lure with Scent but, leave a trail of Scent behind the Lure that fish can use to locate the Lure

BACKGROUND OF THE INVENTION

It has long been known that both freshwater and saltwater fish are attracted by Scent in the water. It has been proved that sharks can detect blood in the water from many miles away.

Divers have been used by anglers for many years to take a Lure to a predetermined depth and position, when trolling. It is to be appreciated that Divers vary greatly in size, shape and composition and care comprised of single or multiple components.

Two of the more popular types of Divers are comprised of a disc shaped upper component, which has a fin, and a disc shaped lower component, that contains a rotating weight. Examples of Divers of this type are shown in U.S. Pat. Nos. 3,844,059; 3,940,872; and 4,567,687.

While there are Scents designed for use with Lures, they are commonly in the form of spray on liquids, aerosols and gels. These means of applying Scent to a Lure have proven to be impractical, especially for this method of fishing because they are messy; are not cost effective and are inefficient. Moreover, they are difficult to apply to a Lure while standing on a rolling deck.

Other Scent are attached to the Lure or are positioned ahead of the Lure; the Scents adversely effect the Lures action.

SUMMARY OF THE INVENTION

In its preferred embodiment, this invention consists of a modified lower component of a Diver that is affixed to the upper component of the Diver and permits the insertion of a Scent between a cavity formed between the upper and lower components.

This lower component is modified to enable Scent to be disbursed into the water surrounding a Lure that is being pulled through the water behind the Diver. In its preferred embodiment, this invention has at least one of a hole through its outer wall that exposes a Scent disc to the water surrounding the Diver. However, the upper component of the Diver could be manufactured for such a purpose.

The modified lower component is made to hold a Scent disc securely in place while trolling. To achieve this, the lower component has been modified to provide a larger space separating the parallel planes between the upper and lower components by means of a center spacer.

In the preferred embodiment of this invention, the lower component also has an extended rim on its leading half, which is intended to serve as a spacer that fits within the upper component. The trailing half of the lower component has no rim, thereby creating a gap between the upper and lower components. This invention utilizes a Scent disc that has a cutaway portion, slightly wider than the center spacer, which extends slightly beyond the radius of the disc. The cutaway allows the Scent disc to engage (i.e., mechanically) with the center spacer. After being inserted through the gap the Scent disc is rotated approximately ninety degrees, by means of a tab that is part of the Scent disc, thereby locking the Scent disc in place when trolling.

One of the objectives of this invention is to offer anglers a practical means of attracting freshwater and saltwater fish to their Lures while trolling without the mess they would have to endure by using spray-on liquids, aerosols or gels. One should remember that while these Scent attractants are very enticing to a fish, they more often than not are repugnant to a human angler. The gels, in particular, can cause a long lasting stench in an angler's tackle box. They also are not easily dispensed (and can cause quite a mess) if one tries to apply them while the boat is rocking.

One key advantage to using this invention is that the Scent can be dispersed in the water surrounding a Lure and not sprayed or rubbed directly onto it. Because the Lure swims through the Scent trail instead of being coated with Scent, clean up is easy. Also, it is a cost efficient way of using Scent because there is no waste from over spraying, as is the case with spray-on liquids and aerosols.

Another objective of this invention is to offer anglers a economical and easy-to-use system of providing at least one of a type of Scent. The utilization of a Scent disc affixed to a Diver offers anglers a means to easily and inexpensively refill, replace or replenish Scent.

Other benefits of this invention are that anglers can convert their Divers that have already been purchased, instead of having to purchase new Divers. Since these type Divers have a relatively large area to place the Scent disc, each Diver has the capacity to carry more Scent and dispense it in a larger area around the Lure for a longer period of time.

In another embodiment of this invention, at least one of an upper component or a low component of the Diver would be comprised of or coated with at least one of a type of Scent that would be disbursed in the water as the Diver is being trolled or retrieved through the water.

The Scent disc could be made from a variety of Scents (i.e., salt, shad, blood, etc.). In its preferred embodiment, the Scent disc would be comprised of at least one of a type of Scented material that would be biodegradable for easy disposal.

DETAILED DESCRIPTION OF THE DRAWINGS

Figure 1:
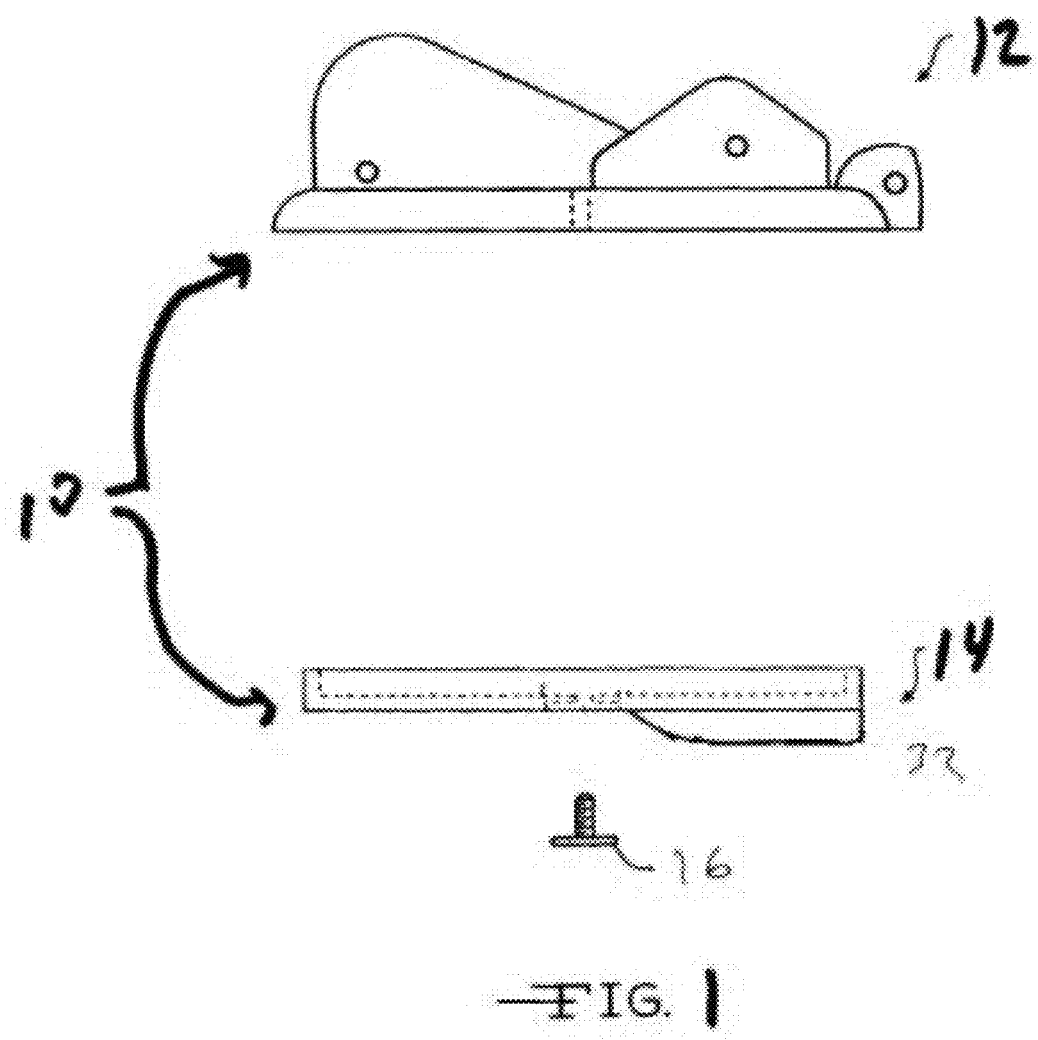
FIG. 1—is a side view of one type of prior art Diver.

FIG. 1 is a side view of a prior art Diver 10 currently offered on the market, consisting of an upper component 12 and a lower component 14. In this instance, the rim on the lower component 14 fits into the rim of upper component 12 and is held in place by a screw 16. The lower component has a weight cavity 32 on its leading side.

Figure 2:
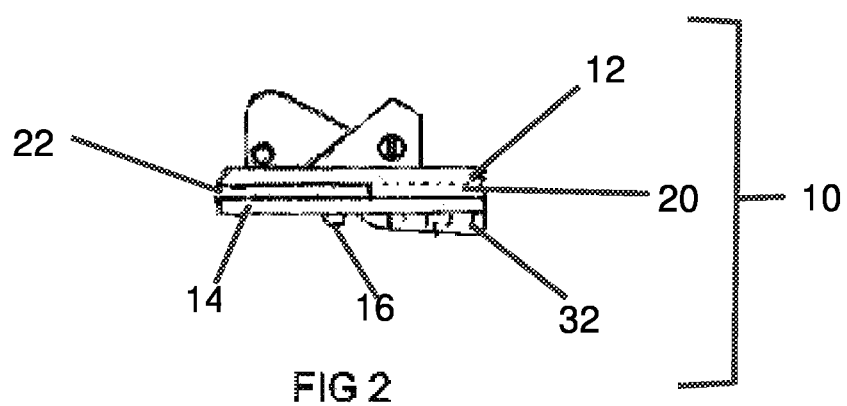
FIG. 2—is a side view of the preferred embodiment of this invention.

FIG. 2 is a side view of the preferred embodiment of this invention. This lower component 14 has been modified to provide a larger space separating the parallel planes of the upper component 12 and the lower component 14 by means of a center spacer 18. The lower component 14 also has an extended rim 20 on its leading half, which is intended to serve as a spacer that fits within the rim of the upper component 12. The trailing half of the lower component 14 has no rim, thereby creating a gap 22 between the upper component 12 and the lower component 14 that allows for the insertion of a Scent disc 24.

Figure 3:
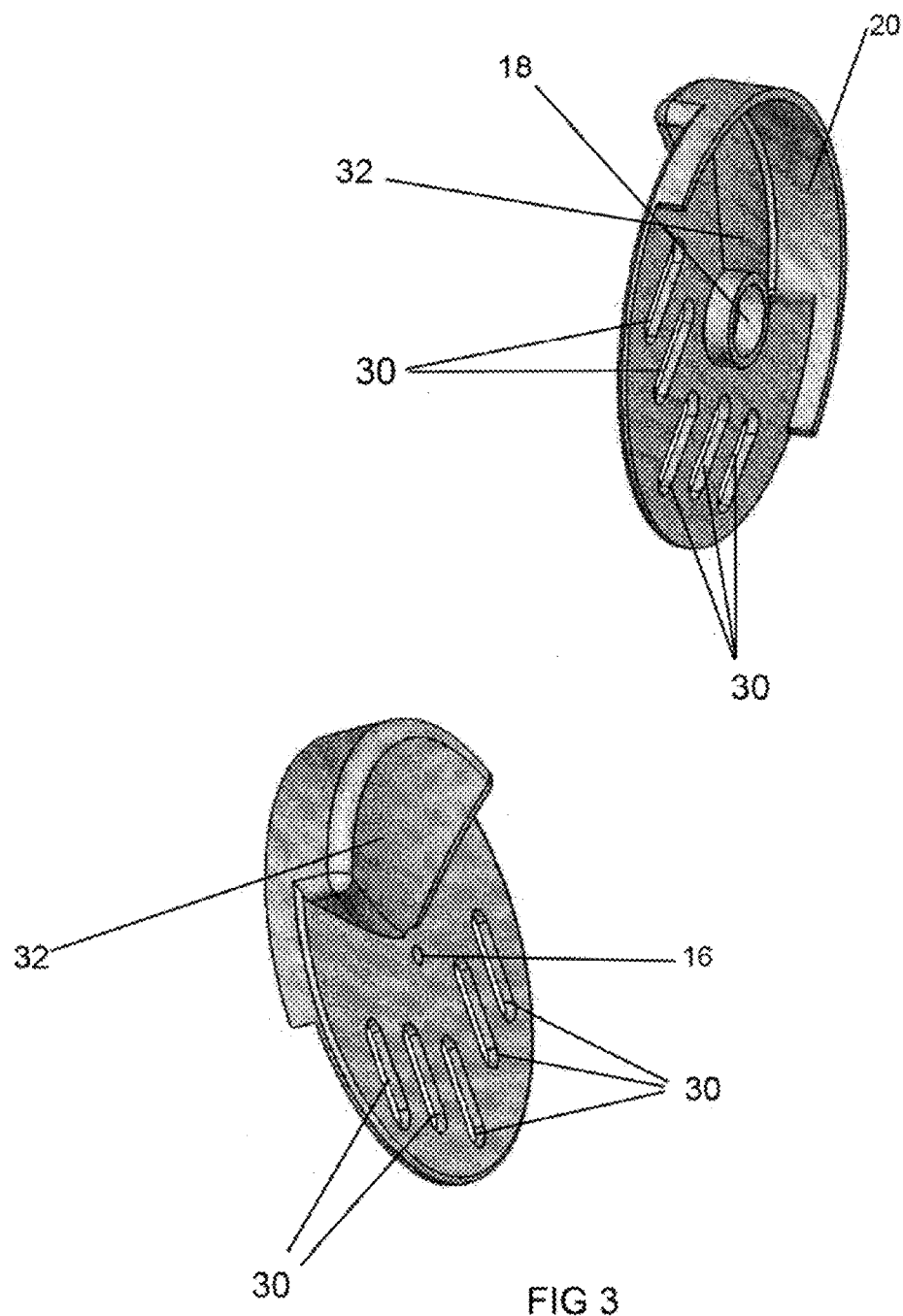
FIG. 3—is a top (inside) view of the preferred embodiment of this invention.

FIG. 3 is an inside view of the preferred embodiment of this invention. This lower component 14 has at least one of a hole 30 through it to permit the water surrounding the Diver 10 to be exposed to the Scent disc 24 and thereby releases scent into the surrounding water.

Figure 4A:
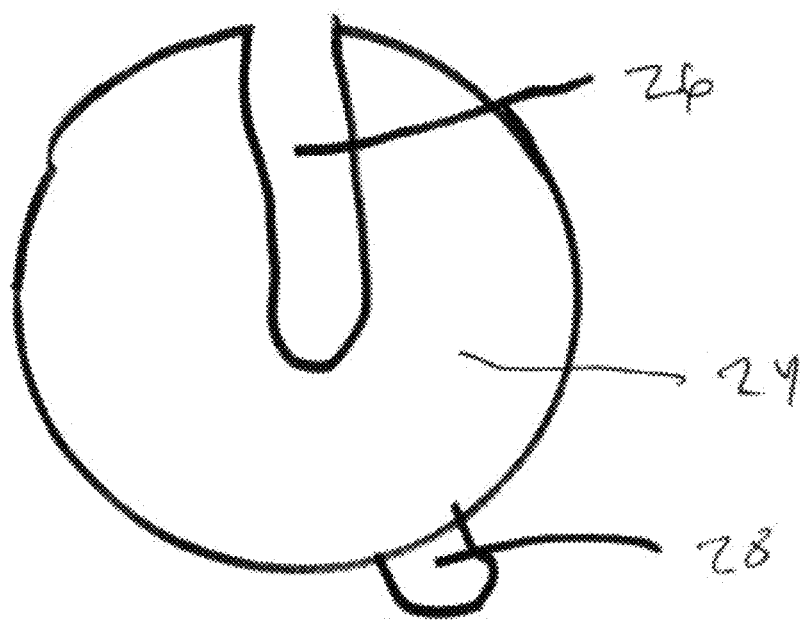
FIG. 4a—is a top view of the Scent disc.

FIG. 4a is a top view of the Scent disc 24. In its preferred embodiment, the Scent disc 24 has a grooved cavity 26 that allows for the Scent disc 24 to interlock with the center spacer 18. After being inserted through the gap 22 the Scent disc 24 is rotated approximately ninety degrees, by means of a tab 28 that is part of the Scent disc 24, thereby interlocking the Scent disc 24 in place when trolling.

Figure 4B:
FIG. 4b—is a side view of the Scent disc.

FIG. 4b is a side view of the Scent disc 24.

Figure 5:
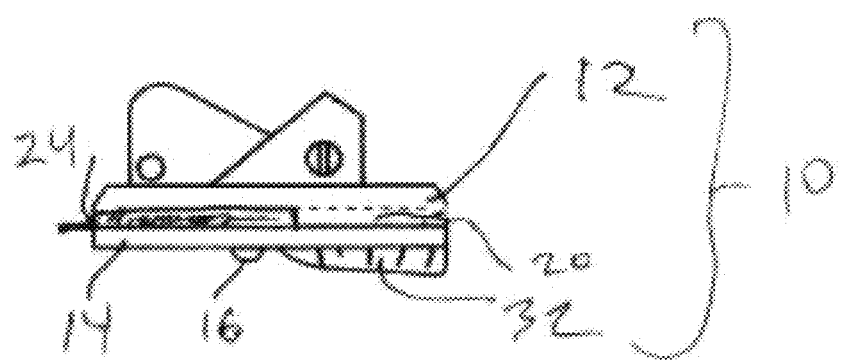
FIG. 5—is a side view of the preferred embodiment of this invention with the Scent disc inserted between the invention and upper component.

FIG. 5 is a side view of the preferred embodiment of this invention with the Scent disc 24 inserted between the preferred invention and an upper component 12.

Changes and modifications in the specifically described in the embodiments can be carried out without departing from the scope of this invention, which is intended to be limited only by the scope of the appending claims.

Having thus described the embodiments of this invention, I now claim:

1. A diver that takes a lure to a predetermined depth and position when trolling comprising:
    a. a top thin flat plate with an outer perimeter;
    b. a bottom flat thin plate with a leading half and a trailing half;
    c. the bottom flat thin plate on said leading half thereof has a cavity with a closed bottom for a weight;
    d. a spacer between the top thin flat plate and the bottom flat thin plate;
    e. a weight that fits within the cavity for a weight;
    f. a gap with a thickness between the top thin flat plate and the bottom flat thin plate formed by the spacer being placed between the top thin flat plate and bottom flat thin plate;
    g. a means for attaching the top thin flat plate, the bottom flat thin plate and the spacer that creates the gap between the top thin flat plate and the bottom flat thin plate, wherein the closed bottom of the cavity extends away from the bottom flat thin plate so that the bottom flat thin plate is positioned between the top thin flat plate and closed bottom of the cavity;
    h. a disk with an outer perimeter and a center than is similar in thickness to the thickness of the gap that fits within the gap that is comprised of a type of scented material that will disperse in water; and,
    i. an opening in the diver that allows water to make contact with the disk causing the scented material in the disk to disperse in the water around the lure as the lure is being trolled through the water.

2. A diver that takes a lure to a predetermined depth and position when trolling as in claim 1 wherein:
    a. the top thin flat plate has a fin.

3. A diver that takes a lure to a predetermined depth and position when trolling as in claim 1 wherein:
    a. the disk locks with the diver to hold the disk securely in place while trolling.

4. A diver that takes a lure to a predetermined depth and position when trolling as in claim 1 wherein:
    a. a wall that extends to the top thin flat plate on the leading half of the bottom flat thin plate and the trailing half of the bottom flat thin plate has no wall.

5. A diver that takes a lure to a predetermined depth and position when trolling as in claim 1 wherein:
    a. the bottom flat thin plate has the opening that allows water to make contact with the disk causing the scented material in the disk to disperse in the water around the lure as the lure is being trolled through the water.

6. A diver that takes a lure to a predetermined depth and position when trolling as in claim 1 wherein:
    a. the means for attaching the top thin flat plate, the bottom flat thin plate and the spacer that creates a gap between the top thin flat plate and the bottom flat thin plate is a screw that passes through the bottom flat thin plate and the spacer and threads into the top thin flat plate.

7. A diver that takes a lure to a predetermined depth and position when trolling comprising:
    a. a top thin flat plate with an outer perimeter;
    b. a bottom flat thin plate with a leading half and a trailing half;
    c. the bottom flat thin plate on said leading half thereof has a cavity with a bottom for a weight; and,
    d. a spacer between the top thin flat plate and the bottom flat thin plate;
    e. a weight that fits within the cavity for a weight;
    f. a gap with a thickness between the top thin flat plate and the bottom flat thin plate formed by the spacer being placed between the top thin flat plate and the bottom flat thin plate;
    g. a means for attaching the top thin flat plate, the bottom flat thin plate and the spacer that creates the gap between the top thin flat plate and the bottom flat thin plate;
    h. a disk with an outer perimeter and a center and that is similar in thickness to the thickness of the gap that fits within the gap that is comprised of a type of scented material that will disperse in water;
    i. an opening in the diver that allows water to make contact with the disk causing the scented material in the disk to disperse in the water around the lure as the lure is being trolled through the water;
    j. the disk has approximately the same outer perimeter as the top thin flat plate;
    k. the disk has a tab; and,
    l. the disk has a slot that extends from the outer perimeter of the disk to slightly beyond the center of the disk.

8. A diver that takes a lure to a predetermined depth and position when trolling as in claim 7 wherein:
    a. the spacer is located between a center of the top thin flat plate and a center of the bottom flat thin plate;
    b. the slot in the disk is slightly wider than the spacer; and,
    c. wherein the disk is placed in the gap and the slot in the disk is guided around the spacer and the disk is rotated approximately 90 degrees to lock the disk in place.

\* \* \* \* \*